(12) United States Patent
Haetty et al.

(10) Patent No.: US 11,875,265 B2
(45) Date of Patent: Jan. 16, 2024

(54) COMPUTER-IMPLEMENTED METHOD AND DEVICE FOR TEXT ANALYSIS (71) Applicant: Robert Bosch GmbH, Stuttgart (DE)

(72) Inventors: Anna Constanze Haetty, Stuttgart (DE); Michael Dorna, Bietigheim-Bissingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 552 days.

(21) Appl. No.: 17/259,864

(22) PCT Filed: Jul. 11, 2019

(86) PCT No.: PCT/EP2019/068692
§ 371 (c)(1),
(2) Date: Jan. 12, 2021

(87) PCT Pub. No.: WO2020/025285
PCT Pub. Date: Feb. 6, 2020

(65) Prior Publication Data
US 2021/0279512 A1    Sep. 9, 2021

(30) Foreign Application Priority Data
Aug. 3, 2018  (DE) .......................... 102018213021.3

(51) Int. Cl.
*G06N 3/08*  (2023.01)
*G06N 3/084*  (2023.01)
(Continued)

(52) U.S. Cl.
CPC ........... *G06N 3/084* (2013.01); *G06F 18/214* (2023.01); *G06F 18/2431* (2023.01); *G06N 3/08* (2013.01)

(58) Field of Classification Search
None
See application file for complete search history.

(56) References Cited

U.S. PATENT DOCUMENTS

| 2016/0019471 | A1* | 1/2016 | Shin ....................... G06N 20/00 706/12 |
| 2017/0308790 | A1* | 10/2017 | Nogueira dos Santos ................... G06N 3/045 |
| 2019/0347556 | A1* | 11/2019 | Yim ....................... G06F 18/22 |

FOREIGN PATENT DOCUMENTS

| CN | 107301246 A | 10/2017 |
| DE | 202017102235 U1 | 5/2017 |

(Continued)

OTHER PUBLICATIONS

International Search Report for PCT/EP2019/068692, dated Oct. 10, 2019.

(Continued)

*Primary Examiner* — Leon Flores
(74) *Attorney, Agent, or Firm* — NORTON ROSE FULBRIGHT US LLP; Gerard A. Messina (57) ABSTRACT

A computer-implemented method for training an artificial neural network using training data, which include features and identifiers, the features characterizing term candidates from a corpus, the corpus including a text from a domain, the identifier characterizing a degree of association to at least three classes for term candidates that differ from one another, different classes indicating different degrees of association of the term candidates to the domain, the training data including an assignment of features to identifiers. An artificial neural network, method for classifying term candidates, and computer-implemented method for generating training data, are also described.

13 Claims, 3 Drawing Sheets (51) Int. Cl.
    *G06F 18/214*     (2023.01)
    *G06F 18/2431*     (2023.01)

(56) References Cited

FOREIGN PATENT DOCUMENTS

| | | |
|---|---|---|
| JP | 2005267397 A | 9/2005 |
| WO | 2017137859 A1 | 8/2017 |

OTHER PUBLICATIONS

Tomas Mikolov et al., "Distributed Representations of Words and Phrases and Their Compositionality," Advances in Neural Information Processing Systems, 2013, pp. 1-9. <https://papers.nips.cc/paper/2013/file/9aa42b31882ec039965f3c4923ce901b-Paper.pdf> Downloaded Jan. 7, 2021.

Tuggener, Don, "Incremental Coreference Resolution for German," Thesis Presented to the Faculty of Arts and Social Sciences of the University of Zurich, 2016, pp. 1-207. https://www.cl.uzh.ch/dam/jcr:b2212d28-6248-47dc-a4e3-04206ff4c6db/tuggener_diss.pdf Downloaded Jan. 7, 2021.

Fabienne Cap, "Morphological Processing of Compounds for Statistical Machine Translation," Institute for Machine Language Processing, University of Stuttgart, 2014, pp. 1-254. <https://elib.uni-stuttgart.de/bitstream/11682/3491/1/fabienne_cap_dissertation.pdf> Downloaded Jan. 7, 2021.

Marion Weller-Di Marco, "Simple Compound Splitting for German," Proceedings of the 13th Workshop on Multiword Expressions (MWE2017), 2017, pp. 161-166. <https://www.aclweb.org/anthology/W17-1722.pdf> Downloaded Jan. 7, 2021.

Rui Wang, et al., "Featureless Domain-Specific Term Extraction With Minimal Labelled Data," Proceedings of Australasian Language Technology Association Workshop, 2016, pp. 103-112. <https://www.aclweb.org/anthology/U16-1011.pdf> Downloaded Jan. 7, 2021.

Corina Dima, et al., "Automatic Noun Compound Interpretation Using Deep Neural Networks and Word Embeddings," Proceedings of the 11th International Conference on Computational Semantics, 2015, pp. 173-183. <https://www.aciweb.org/anthology/W15-0122.pdf> Downloaded Jan. 7, 2021.

Behrang Zadeh, et al., "Evaluation of Technology Term Recognition With Random Indexing," Proceedings of the Ninth International Conference on Language Resources and Evaluation (LREC'14), 2014, pp. 4027-4032. <http://www.lrec-conf.org/proceedings/lrec2014/pdf/920_Paper.pdf> Downloaded Jan. 7, 2021.

Anna Hätty, et al., "A Laypeople Study on Terminology Identification Across Domains and Task Definitions," Proceedings of the 16th Annual Conference of the North American Chapter of the Association for Computational Linguistics: Human Language Technologies, 2018, pp. 321-326. <https://www.aclweb.org/anthology/N18-2052.pdf> Downloaded Jan. 7, 2021.

Anna Hätty, et al., "Evaluating the Reliability and Interaction of Recursively Used Feature Classes for Terminology Action," Proceedings of the Student Research Workshop at the 15th Conference of the European Chapter of the Association for Computational Linguistics, 2017, pp. 113-121. <https://www.aclweb.org/anthology/E17-4012.pdf> Downloaded Jan. 7, 2021.

Toan Pham Van et, al., "Vietnamese News Classification Based on Bow With Keywords Extraction and Neural Network," 21st Asia Pacific Symposium on Intelligent and Evolutionary Systems (IES), IEEE, 2017, pp. 43-48.

* cited by examiner

COMPUTER-IMPLEMENTED METHOD AND DEVICE FOR TEXT ANALYSIS

FIELD

The present invention relates to a computer-implemented method and to devices for text analysis, in particular for predicting an association of a compound from a text relating to a special field.

BACKGROUND INFORMATION

Machine-based systems for text analysis use rule-based or statistical methods for terminology extraction and keywording. Hybrid methods and machine-learning methods are also employed for text analysis.

German Patent Application No. DE 20 2017 102 235 U1 describes in general aspects of a machine learning method.

Such methods for an assignment of a compound to a particular special field are based on binary decisions. In contrast thereto, it is desirable to enable an improved approach.

SUMMARY

In the following description, the term "corpus" refers to a text or to a collection of texts. A subject-specific corpus contains only text that is specific to a domain. A general-language corpus refers to text or to a collection of texts without a specific assignment to a domain. All texts of a cooking forum in the Internet represent, for example, a subject-specific corpus. All Wikipedia entries represent, for example, a general-language corpus.

In the following description, parts of a corpus that are analyzed are referred to as term candidates. Besides the term candidates, a text may also contain parts that may not be or are not to be analyzed.

In the following description, the term compound refers to a compound word, i.e., a word that is assembled by connecting at least two already existing words or word stems.

In the following description, the term component refers to a part of a compound, i.e., a part of the compound word.

A degree of association of a component or of a compound to a particular domain is referred to below as class. A particular compound is assigned, for example, to a particular class if its degree of association to this domain has a particular value or is in a particular value range. Unique classes are defined, for example, with various values or with various non-overlapping value ranges.

In accordance with an example embodiment of the present invention, in a computer-implemented method for training an artificial neural network using training data, which includes features and identifiers, the features characterize term candidates from a corpus, the corpus encompassing a text from a domain. An identifier characterizes a degree of association to at least three classes for the term candidates that differ from one another. Different classes indicate different degrees of association of the term candidate to the domain. The training data include an assignment of features to identifiers. In the method, one feature is predefined for one input layer of the artificial neural network, the artificial neural network assigning an identifier to the feature from the input layer in a prediction in an output layer of the artificial neural network.

The identifier from the output layer is compared in a comparison, with the identifier that is assigned to the feature in the training data. At least one parameter of the artificial neural network, which characterizes a connection of the artificial neural network between the input layer and the output layer, is learned as a function of the result of the comparison. As a result, terms are classifiable into four classes NONTERM, SIMTERM, TERM, SPECTERM, instead of into two classes, term or non-term.

The term candidates are advantageously drawn from a corpus subject-specific to the domain. Such a corpus is suitable, in particular, for the training of the classification.

The term candidates are advantageously assigned to at least one of the classes and the features for the term candidates are determined, in particular, a word vector being determined, and at least one parameter of the artificial neural network being trained using the features.

The term candidates are advantageously compounds including at least two components. The training data assign compounds to at least one of more than three classes. This is meaningful, in particular in the case of compounds, since a compound may exhibit differing specificity or centrality for a domain as a function of its components. For example, it is probable that a specific technical term includes one or multiple very specific components. A general term includes, for example, no component specific to this domain. The artificial neural network is thus trained for a very fine distinction.

Compounds from a corpus subject-specific to the domain are advantageously split as term candidates into components, the compounds are assigned to at least one of the classes, the features for the compounds and the components are determined, and at least one parameter of the artificial neural network is trained using the features. In this way, the compound and its components are taken into consideration in the training. This further improves the learning behavior.

At least one word vector is advantageously determined as a feature. A word vector is a particularly well-suited feature for the training method.

A productivity and a frequency of the components are advantageously determined as features on the basis of the specific corpus. Productivity and frequency are further features with respect to a frequency of occurrence of the components. This further improves the training.

In accordance with an example embodiment of the present invention, in a computer-implemented method for generating training data for a training of an artificial neural network, in which the training data include features and identifiers, features are determined, which characterize term candidates from a corpus, the corpus including a text from a domain, an identifier being determined, which characterizes a degree of association to at least three classes for the term candidates that differ from one another, different classes indicating different degrees of association of the term candidate to the domain, at least one of the identifiers being assigned to one feature. These training data are particularly suited for a training of a classification using more than three classes.

The term candidates are advantageously drawn from a corpus subject-specific to the domain. The subject-specific corpus provides a high density of relevant term candidates of a domain.

The term candidates are advantageously assigned to at least one of the classes and the features for the term candidates are determined, a word vector, in particular, being determined. The assignment of features to classes is a representation of the classification of term candidates particularly suited for machine learning.

The term candidates are advantageously compounds including at least two components. This form of the training data is particularly suited for a fine subdivision of the classes. With respect to the assignment, compounds are not referred to either as a term or as a non-term due to a possible classification of their components in different classes, but may be classified depending on the degree of their association to a domain in other classes that differ from the class non-term.

Compounds from a corpus subject-specific to the domain are advantageously split as term candidates into components, the compounds are assigned to at least one of the classes, and the features for the compounds and the components are determined. The additional features enable a better training of the artificial neural network, even in the case of limited availability of term candidates from a limited volume of text, without new texts including new compounds also having to be added.

At least one word vector is advantageously determined as a feature. If the word vectors are used in the training data, the artificial neural network itself requires no embedding layer, which determines word vectors as features from the term candidates.

A productivity and a frequency of the components are advantageously determined as features on the basis of the specific corpus. The additional features of productivity and a frequency also enable a better training of the artificial neural network, even in the case of limited availability of the term candidates from a limited volume of text, without new texts including new compounds having to be added.

An artificial neural network includes an input layer, for which a feature is predefinable, the artificial neural network being designed to assign an identifier to the feature from the input layer in a prediction in an output layer of the artificial neural network, the features characterizing term candidates from a corpus, the corpus including a text from a domain, the identifier characterizing at least three classes for the term candidates that differ from one another, different classes indicating different degrees of association of the term candidates to the domain. This artificial neural network is a particularly efficient implementation of a classification of compounds into more than two classes.

The artificial neural network advantageously includes at least one first input layer, to which a compound and its components for a first feature are predefinable, the artificial neural network including at least one second input layer, for which a productivity and a frequency of the components for a second feature are predefinable, the output layer being situated downstream from the input layers and outputting the identifier in the prediction as a function of the first feature and of the second feature. The additional features further improve the efficiency and reliability of the prediction of the artificial neural network.

The artificial neural network preferably includes a further output layer, which is designed to output a degree of an assignment of a compound to the at least three classes regardless of the productivity and the frequency of its components. This further output layer is an auxiliary output, which is usable in an error function for an optimization.

The artificial neural network preferably includes a further output layer, which is designed to output a degree of assignment of one of the components to the at least three classes as a function of the productivity and the frequency of this component. This further output layer is an auxiliary output, which is usable in an error function for an optimization.

In a method for classifying term candidates, a feature is predefined to an input layer of an artificial neural network, an identifier being assigned to the feature from the input layer in a prediction in an output layer of the artificial neural network, the features characterizing term candidates from a corpus, the corpus including a text from a domain, the identifier characterizing at least three classes for the term candidates that differ from one another, different classes indicating different degrees of association of the term candidate to the domain. In addition to a recognition of whether a term candidate is a term or no term with respect to the domain, the classification in more than two classes also enables the provision of a finely classified dataset including more than two classes.

A compound and its components for a first feature are advantageously predefined to a first input layer, a productivity and a frequency of the components for a second feature being predefined to a second input layer, the output layer being situated downstream from the input layers and the identifier in the prediction being output as a function of the first feature and of the second feature. The prediction is further improved by the addition of these additional features.

BRIEF DESCRIPTION OF THE DRAWINGS

Further advantageous embodiments of the present invention result from the following description and from the figures.

DETAILED DESCRIPTION OF EXAMPLE EMBODIMENTS

In the following description, the term "domain" refers to a special field or subject area.

In an example described below, the classes NONTERM, SIMTERM, TERM, SPECTERM are used.

NONTERM is a class for components or compounds, which have no particular connection to the domain. For example, a general language compound with no particular connection to the domain is classified as a NONTERM.

SIMTERM is a class for components or compounds, which have a greater connection to the domain than components or compounds from the class NONTERM. For example, components or compounds having a semantic connection to the domain are classified as SIMTERM.

TERM is a class for components or compounds, which have a greater connection to the domain than components or compounds from the class SIMTERM. For example, comprehensible components or compounds with a connection to the domain are classified as TERM.

SPECTERM is a class for components or compounds, which have a greater connection to the domain than components or compounds from the class TERM. For example, incomprehensible components or compounds with a connection to the domain are classified as SPECTERM.

These four classes represent different degrees of association to a domain. More precisely, the degree of association to the domain increases with the classification of NONTERM via SIMTERM and TERM to SPECTERM. For example, the four classes are assigned four identifiers as follows. The class NONTERM is assigned a first scalar $o_1$, the class SIMTERM is assigned a second scalar $o_2$, the class TERM is assigned a third scalar $o_3$, and the class SPECTERM is assigned a fourth scalar $o_4$. In the example, a vector $o=(o_2, o_2, o_3, o_4)^T$ is used as an identifier. Each scalar in the example has a value between 0 and 1, the degree of association increasing with the value of the respective scalar from 0 to 1.

The degree of association of components or compounds of a corpus represents a measure of a degree of difficulty of the text from the corpus, i.e., its level or its specificity with respect to the domain. Texts including components or compounds in the class SPECTERM are in all probability composed by experts or for experts. Texts without components or compounds in the classes TERM or SPECTERM are in all probability non-specific with respect to the domain.

In the following description, training data include features and identifiers. More precisely, at least one identifier is assigned to a feature in the training data. In one aspect, at least one identifier is assigned to each feature.

Features characterize term candidates in the following description. In one aspect, a feature represents a term candidate unambiguously. A feature is, for example, a word vector that represents the term candidate. In a further aspect, a feature represents a productivity or a frequency of a component of a compound in a subject-specific corpus with respect to a general-language corpus.

Identifiers characterize one class in the following description. In one aspect, an identifier represents one class unambiguously. An identifier is, for example, a vector s including scalars $s_1, s_2, s_3, s_4$, whose value between 0 and 1 represents a degree of association to this class. The value 1 represents, for example, a high degree of association. The value 0 represents, for example, a low degree of association.

An artificial neural network according to a first specific embodiment is described below with reference to FIG. 1 as an example of a model for a classification of text as a function of the degree of association of a component or of a compound to a particular domain.

An output O of the network is defined, for example, as:

$$O=\alpha(\varphi(E(x)*W_1)*W_2))$$

In this case, x is a word, i.e., a compound or a component and $z=E(x)$ is the output of an embedding layer in which the function $$E: x \to z$$

maps a word x onto a vector z. In the example, vector z for a word x is a 200-dimensional word vector. If a number of n words is used in a batch of the size b, n vectors z are used in a matrix Z having the dimension [n*200,b].

$W_1$ and $W_2$ are weighting matrices. Weighting matrix $W_1$ in the example for n words has a dimension [64, n*200] matched to the n 200-dimensional vectors z.

$\varphi$ is an activation function. In the example, the hyperbolic tangent function is used as an activation function as follows $$\varphi(z*W_1)=\tanh(z*W_1).$$

In a dense layer in the example, 106 $d=\varphi(W_1*z)$ with the dimensions [64,b] is used at output d of the second concealed layer.

The weighting matrix $W_2$ in the example has a dimension [4, 64] matched to the four classes NONTERM, SIMTERM, TERM, SPECTERM. In the example, 4 neurons are used as output 0 in the output layer. $\sigma$ in the example is a softmax activation function, with which a probability of an association to one of the classes is determined. For this purpose, the softmax activation function converts a raw value into a probability, which also serves as a measure for a certainty with respect to a correctness of the result. The following function is used as a software function for a neuron i from the output O, for example, where n=4 neurons $O=(o_1, o_2, o_3, o_4)$ in the output layer for each scalar output $o_i$.

$$o_i = \sigma(y_i) = \frac{e^{y_i}}{\sum_{k=0}^{n} e^{y_k}}$$

$y_i$ being the line i and $y_k$ being the line k of a vector $y=\varphi(E(x)*W_1)*W_2$.

An exemplary assignment is indicated below:

NONTERM is assigned $o_1$, SIMTERM is assigned $o_2$, TERM is assigned $o_3$, SPECTERM is assigned $o_4$. The scalar value $o_f$ is a degree of association of the term to the respective class.

Figure 1:
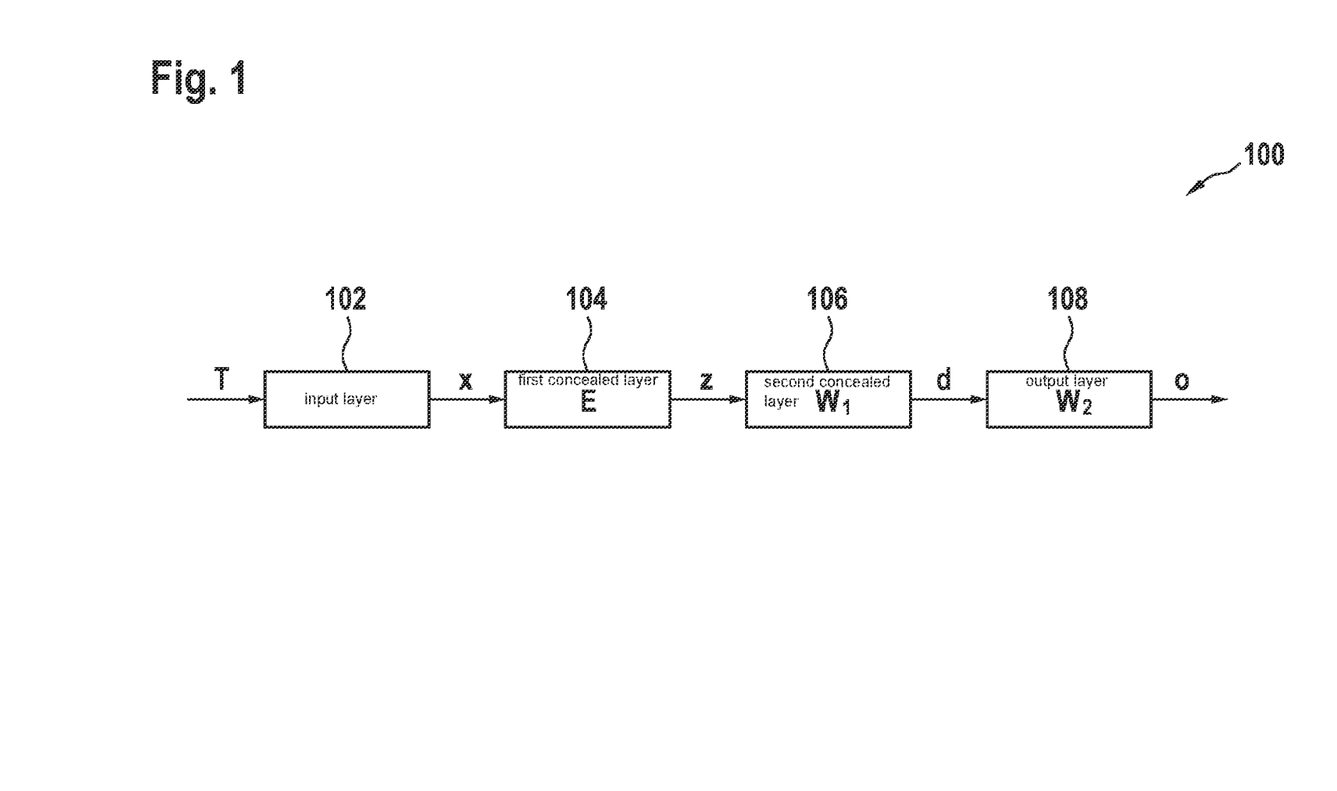
FIG. 1 schematically shows parts of an artificial neural network, in accordance with an example embodiment of the present invention.

FIG. 1 schematically shows, as an example of a model, parts of an artificial neural network 100 having layers one behind the other. Artificial neural network 100 includes an input layer 102, a first concealed layer 104, a second concealed layer 106 and an output layer 108.

Input layer 102 is designed to transfer a term candidate T as word x to first concealed layer 104.

First concealed layer 104 in the example is the function E(x), i.e., the embedding layer, in which the function $$E: x \to z$$

maps word x onto vector z.

The mapping takes place, for example, with the aid of a Continuous Bag of Words, CBOW, model. For example, a Word2Vec CBOW model according to Tomas Mikolov et al., 2013, "Distributed representations of words and phrases and their compositionality," Advances in Neural Information Processing Systems, pages 3111-3119, Curran Associates, Inc., is used to generate the 200-dimensional word vector.

In one aspect, the CBOW model is trained, for example, with the aid of a lexicon, to learn the weights of first concealed layer 104 for words. For example, a previously trained CBOW model is used to initialize the embedding layer. First concealed layer 104 is then initialized using corresponding weights for words.

Words that are not recognized as such are mapped, for example, onto a word vector z including random elements. Words that have been recognized are mapped onto corresponding word vector z. The word vector represents the term candidates.

Word vector z is transferred from first concealed layer 104 to second concealed layer 106.

Second concealed layer 106 uses first weight matrix $W_1$ and activation function $\varphi$. In the example, the hyperbolic tangent function is used as an activation function in second concealed layer 106 as follows:

$$d=\varphi(E(x)*W_1)=\tanh(z*W_1).$$

Output d is transferred to output layer 108. In the example, the softmax activation function is used, with which the probability of the association of word x to one of the classes is determined.

The weight matrices and the activation functions are parameters of artificial neural network 100. The parameters, in particular the weight matrices, are variable within a training.

A method for training this artificial neural network 100 is described below.

Training data for training this artificial neural network 100 include features and identifiers. More precisely, the training data include an assignment of features to identifiers.

The features characterize term candidates T from a subject-specific corpus. An identifier s characterizes at least three classes for term candidates T that differ from one another. In the example, identifier s characterizes the four classes NONTERM, SIMTERM, TERM, SPECTERM. The classes indicate the degree of the association of term candidate T to the domain.

Annotators, i.e., humans, for example, select words or compound words from the subject-specific corpus as term candidates T and assign these to one of the four classes. For a term candidate T, the assignment in the training data includes as a feature, for example, a word vector z, which represents term candidate T. In identifier s, the class NONTERM is assigned a first scalar $s_1$, the class SIMTERM is assigned a second scalar $s_2$, the class TERM is assigned a third scalar $s_3$, and the class SPECTERM is assigned a fourth scalar $s_4$. In the example, a vector $s=(s_1, s_2, s_3, s_4)$ T is used as an identifier. Each scalar in the example has a value between 0 and 1, the degree of association increasing, for example, with the value of the respective scalar from 0 to 1. The identifier includes values selected by the annotator.

When artificial neural network 100 is trained, the compounds, automatically sought with the aid of a splitter and with the aid of already trained artificial neural network 100, are able to predict the classes.

A term candidate T is predefined for input layer 102 of artificial neural network 100. It may be provided to initialize the parameters of artificial neural network 100 with random values before the training. For the purpose of training, a group of term candidates T may simultaneously be predefined as a batch, for example, with b=32 training examples.

Artificial neural network 100 assigns to a feature, which represents term candidate T from input layer 102, an identifier o in a prediction in output layer 108 of artificial neural network 100. The prediction takes place with the aid of the described model. The result of the prediction in the example with b=32 training examples is a matrix O including 32 vectors $o_1, \ldots o_{32}$.

Identifier o from output layer 108 is compared in a comparison with identifier s assigned to this feature in the training data. For example, an error function is evaluated in the comparison, for example, a difference, in particular, a Euclidean distance between vector s and vector o.

At least one parameter of artificial neural network 100 is learned as a function of the result of the comparison. The parameter characterizes a connection of artificial neural network 100 between input layer 102 and output layer 108. For example, weight matrices $W_1$ and $W_2$ are learned as a function of the error function until the error function is minimized. The Stochastic Gradient Descent (SGD) method, for example, is used in this case.

A multitude of assignments of features to identifiers are preferably provided in the training data. In the example, 50 epochs are used. In each of the 50 epochs, 32 training examples are processed. A training dataset in this case includes 1600 assignments. It may be provided to carry out the training using a different number of epochs or a different size of a training dataset.

By using the at least three classes, it is possible, instead of a binary decision of whether a term candidate T is or is not a term from the domain, to provide an artificial neural network that defines a degree of the association. A finer classification is thereby possible.

It is particularly advantageous if exclusively compounds are used as term candidates T. An artificial neural network trained in such a way enables a particularly efficient classification of texts based on compounds contained therein.

Training data of a training dataset in this case include an assignment of features, which represent compounds, to the identifiers, which represent the class into which the compounds have been classified by annotators. The compounds are drawn from a corpus subject-specific to a domain. The model is trained for a classification as a function of the degree of an association of a component to a particular domain.

The training dataset are based on the following aspects.

Compounds are compound words that contain words or word stems as components. Depending on the composition of the component, compounds are formed which have a more or less high degree of association to a domain. For example, a component corn may be assigned to a domain cooking or to domain agriculture. A compound "corn growing" (in German, "Maisanbau") in this example may only be assigned to the domain agriculture. A compound cornmeal in this example may only be assigned to the domain cooking. A classification of the compound in this example is possible via a classification of the two further components-growing and-meal. The compound corn growing may also be associated with regard to content with the domain cooking. The compound corn growing may, for example, be classified in the class SIMTERM.

To create the training dataset, a text or a collection of texts having a known connection to this domain is used as a subject-specific corpus. In the example, the subject-specific corpus is a collection of texts of cooking recipes. These include as term candidates possible technical terms from the domain "cooking."

Term candidates are identified from the subject-specific corpus. In the example, compounds are identified as term candidates. The term candidates, i.e., lexical compound definitions or examples, are assigned to the compounds. A text, for example, is used as a lexical definition or example.

For the training and the classification, term candidates are considered in the example, which have a particular minimum length. Term candidates including only one letter are ignored in this case. Without a minimum length, term candidates including only one letter could alternatively be classified into the class NONTERM.

A user-based assessment with respect to a specificity and centrality are assigned as the gold standard for the training to the term candidates by an annotator or by multiple annotators. In the example, a multi-dimensional scale is used for a term candidate with the aid of the four classes in order to assign to the term candidate a classification into one of the classes NONTERM, SIMTERM, TERM or SPECTERM. The annotators are urged to classify a term candidate into the class SPECTERM if it is very specific for the particular domain, in the example, "cooking" and exhibits a high degree of proximity to the particular domain. The annotators are urged to classify a term candidate into the class SIMTERM if it is very specific and exhibits an average degree of proximity to the particular domain. The annotators are urged to classify a term candidate into the class TERM if it exhibits a high degree of proximity to the particular domain, in the example, "cooking," but is otherwise technically non-specific. The annotators are urged to classify other term candidates into the class NONTERM.

The compound "corn growing" (in German, "Maisanbau") is considered as an example for a classification of a term candidate from the subject-specific corpus. The compound corn growing and the definition for classification are submitted to a multitude of annotators. Some annotators classify the compound, for example, based on this definition into the class NONTERM. Other annotators classify the compound, for example, into the class SIMTERM.

The training dataset in the example is supplemented by the entry corn growing in the class, into which the compound corn growing has been classified by all or by a majority of the annotators. A training set contains, for example, an assignment of a feature representing the entry corn growing to one of the classes. For example, the word vector z, which characterizes the term candidate corn growing, is assigned to vector s, which characterizes the class SIMTERM.

A training dataset contains a multitude of such assignments for a multitude of different term candidates. The model is trained based on this training set. The multitude of such assignments from a training dataset is used in the training in order to learn the weight matrices.

In the first specific embodiment, word vectors z representing the compounds are used as features. Weight matrices $W_1$ and $W_2$ are learned as a function of these word vectors Z, of the vector s and of a corresponding error function.

A further improvement is possible if, in addition to the compounds, their components are used. For this purpose, further features are used.

Figure 2:
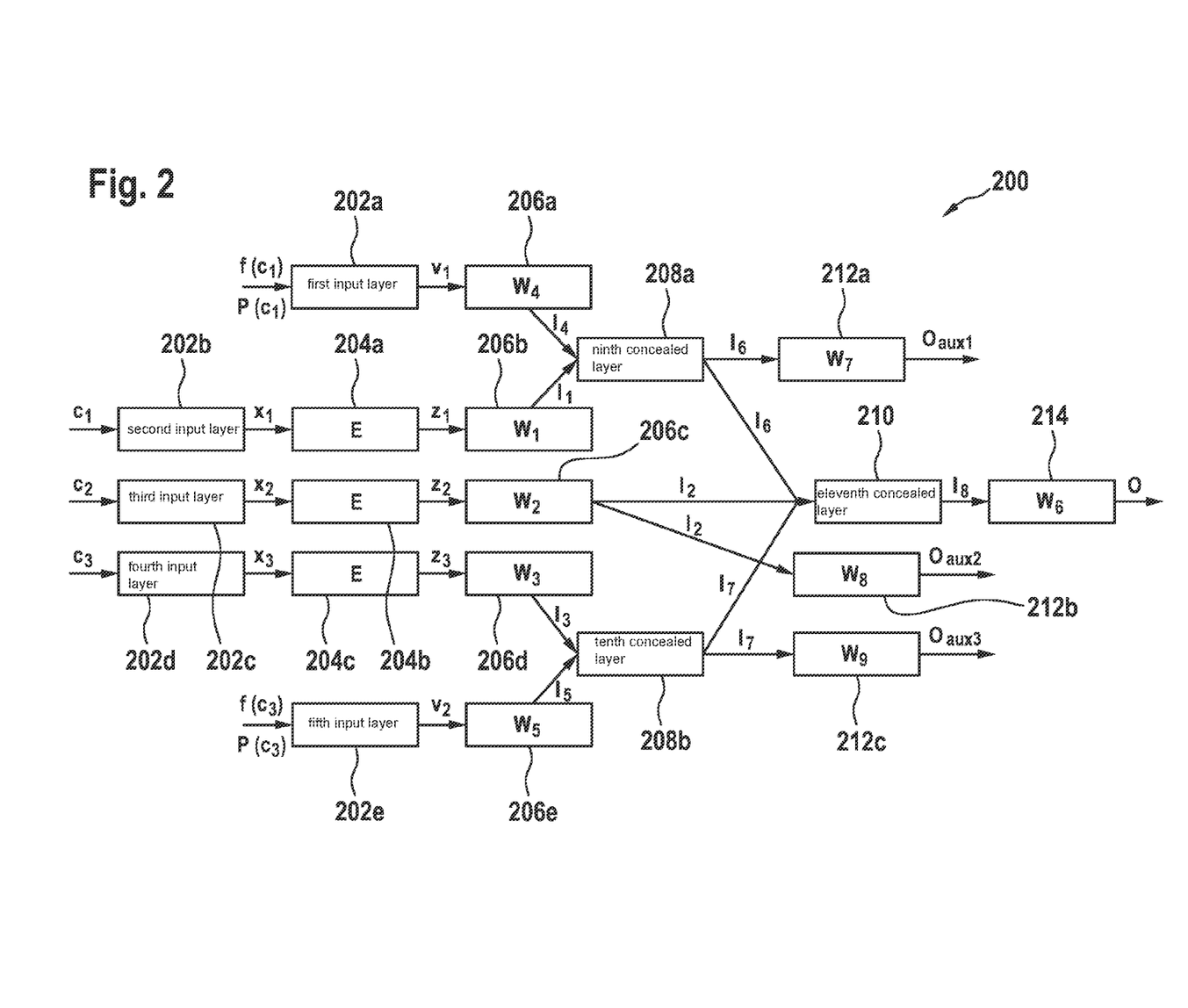
FIG. 2 schematically shows parts of a model for text analysis, in accordance with an example embodiment of the present invention.

This is described below based on artificial neural network 200 according to a second specific embodiment, which is schematically depicted in FIG. 2.

Artificial neural network 200 includes a first input layer 202a, a second input layer 202b, a third input layer 202c, a fourth input layer 202d and a fifth input layer 202e. Artificial neural network 200 includes a first concealed layer 204a, which is situated downstream from second input layer 202b, a second concealed layer 204b, which is situated downstream from third input layer 202c, a third concealed layer 204c, which is situated downstream from fourth input layer 202e.

Artificial neural network 200 includes a fourth concealed layer 206a, which is situated downstream from first input layer 202a. Artificial neural network 200 includes a fifth concealed layer 206b, which is situated downstream from first concealed layer 204a. Artificial neural network 200 includes a sixth concealed layer 206c, which is situated downstream from second concealed layer 204b. Artificial neural network 200 includes a seventh concealed layer 206d, which is situated downstream from third concealed layer 204c. Artificial neural network 200 includes an eighth concealed layer 206e, which is situated downstream from fifth input layer 202e.

Artificial neural network 200 includes a ninth concealed layer 208a, which is situated downstream from fourth concealed layer 206a and fifth concealed layer 206b. Artificial neural network 200 includes a tenth concealed layer 208b, which is situated downstream from seventh concealed layer 206d and eighth concealed layer 206e.

Artificial neural network 200 includes an eleventh concealed layer 210, which is situated downstream from ninth concealed layer 208a and tenth concealed layer 208b. Artificial neural network 200 includes a first output layer 212a, which is situated downstream from ninth concealed layer 208a. Artificial neural layer 200 includes a second output layer 212b, which is situated downstream from sixth concealed layer 206c. Artificial neural network 200 includes a third output layer 212c, which is situated downstream from tenth concealed layer 208b. Artificial neural network 200 includes a fourth output layer 214, which is situated downstream from eleventh concealed layer 210.

Third input layer 202c is designed as an input for term candidates. In the example, compounds $c_2$, i.e., word compounds, are used as term candidates.

Second input layer 202b and fourth input layer 202d are designed as an input layer for components $c_1$, $c_3$ of compound $c_2$. A first component $c_1$ and a second component $c_3$ are depicted in FIG. 2, however, more than two components may also be used if the compound includes more than two components.

In general, an input of artificial neural network 200 includes compound $c_2$ and each of its components.

In one batch including a number b of training datasets, one vector each of the dimension [1, b] for each of the components and the compound are individually predefined to the input layers. A vector x, for example, in which compound $c_2$ and its components are concatenated, is used as an input for the concealed layers situated downstream from second input layer 202b, third input layer 202c and fourth input layer 202d. For the example including two components $c_1$, $c_3$ depicted in FIG. 2, the following vector is used, for example, in a model for concatenated vectors:

$$x=(c_1,c_2,c_3)$$

The function E maps x, for example, on a concatenated word vector $$z=(z_1,z_2,z_3)$$

The word vector z is a feature for the assignment.

It may also be provided to assign each input an individual word and to concatenate the inputs only in the dense layer. In this case, individual vectors $$x_1=c_1$$

$$x_2=c_2$$

$$x_3=c_3$$

and $$z_1=E(x_1)$$

$$z_2=E(x_2)$$

$$z_3=E(x_3)$$

are used.

In a batch of the size b, vectors $x_1$, $x_2$, $x_3$ have the dimension [1,b], $z_1$, $z_2$, $z_3$ representing a matrix of the dimension [200, b].

A respective output of fifth concealed layer 206b, of sixth concealed layer 206c and of seventh concealed layer 206d is reproduced below for the individually calculated vectors:

$$I_1=\varphi(E(c_1)*W_1) \text{output of fifth concealed layer } 206b$$

$$I_2=\varphi(E(c_2)*W_2) \text{output of sixth concealed layer } 206c$$

$$I_3=\varphi(E)c_3)*W_3) \text{output of seventh concealed layer } 206d$$

The function E represents the embedding layer, which maps the respective part of vector x onto a respective part of word vector z, for example, with the aid of the bag of words model.

$$E:x\rightarrow z$$

Output $I_1$ of fifth concealed layer 206b, output $I_2$ of sixth concealed layer 206c and output $I_3$ of seventh concealed layer 206d in the example of the batch with b training data has in each case dimension [64, b].

First input layer 202$a$ is an input for a first frequency $f(c_1)$ and a first productivity $P(c_1)$ of a first component $c_1$ from a compound $c_2$.

Fifth input layer 202$c$ is an input for a second frequency $f(c_3)$ and a second productivity $P(c_3)$ of a second component $c_3$ from a compound $c_2$. Frequency in this case refers to a frequency of an occurrence of respective component $c_1$, $c_3$ in other compounds in the subject-specific corpus with respect to all components from the subject-specific corpus.

Productivity in this case refers to a number of compounds that differ from one another, in which respective component $c_1$, $c_3$ are contained in compounds other than compound $c_2$ in the subject-specific corpus.

The productivity and the frequency are two further features for the assignment.

In the example, $$v_1=(f(c_1);P(c_1))$$

is used for first input layer 202$a$ and $$v_2=(f(c_3);P(c_3))$$

is used for fifth input layer 202$c$.

In general, a multi-dimensional vector v with the dimensions frequency and productivity of the individual components is used as an input:

$$v=(v_1,v_2).$$

An output $I_4$ of fourth concealed layer 206$a$ and an output $I_5$ of eighth concealed layer 206$e$ are $$I_4=\varphi(W4*v_1)\text{output of fourth concealed layer } \mathbf{206}a$$

$$I_5=\varphi(W5*v_2)\text{output of eighth concealed layer } \mathbf{206}e.$$

Output $I_4$ of fourth concealed layer 206$a$ and output $I_1$ of fifth concealed layer 206$b$ each have in the B example of the batch including b training data the dimensions [64,b]. Output $I_4$ of fourth concealed layer 206$a$ and output $I_1$ of fifth concealed layer 206$b$ form an input of ninth concealed layer 208$a$.

Output $I_5$ of eighth concealed layer 206$e$ and output $I_3$ of seventh concealed layer 206$d$ each have dimension [64,b] in the example of the batch including b training data. Output $I_5$ of eighth concealed layer 206$e$ and output $I_3$ of seventh concealed layer 206$d$ form an input of tenth concealed layer 208$b$.

An output $I_6$ of ninth concealed layer 208$a$ and an output $I_7$ of tenth concealed layer 208$b$ are $$I_6=[I_1,I_4]^T \text{ output of ninth concealed layer } \mathbf{208}a,$$

$$I_7=[I_3,I_5]^T \text{ output of tenth concealed layer } \mathbf{208}b.$$

Ninth concealed layer 208$a$ and tenth concealed layer 208$b$ concatenate their respective inputs in the example.

Output $I_6$ of ninth concealed layer 208$a$ and output $I_7$ of tenth concealed layer 208$b$ each have a dimension [128, b] in the example of the batch including b training data. Output $I_6$ of ninth concealed layer 208$a$ and output $I_7$ of tenth concealed layer 208$b$ form with output $I_2$ of sixth concealed layer 206$c$ the input of eleventh concealed layer 210.

Output $I_8$ of eleventh concealed layer 210 is $$I_8=[I_6;I_2;I_7]^T \text{ output of eleventh concealed layer } \mathbf{210}.$$

Output $I_8$ of eleventh concealed layer 210 has the dimension [320, b] in the example of the batch including b training data. In one aspect, the output of fourth output layer 214 forms artificial neural network 200:

$$O=\sigma(W_6*I_8)$$

The output of artificial neural network 200, in the example of the output of fourth output layer 214, has a dimension [4, b] in the example of the batch including b training data.

For an optimization of artificial neural network 200 during or after the training, this output O is used in an error function, for example, in a stochastic gradient descent method, with vector s, in order to adapt the weights of the weight matrices.

In one optional further aspect, output O and auxiliary outputs $O_{aux}$ are provided $$O=\sigma(W_6*I_8)\text{output of fourth output layer } \mathbf{214},$$

$$O_{aux1}=\sigma(W_7*I_6)\text{output of first output layer } \mathbf{212}a,$$

$$O_{aux2}=\sigma(We*I_2)\text{output of second output layer } \mathbf{212}b,$$

$$O_{aux3}=\sigma(W_9*I_7)\text{output of third output layer } \mathbf{212}c.$$

Auxiliary outputs $O_{aux1}$, $O_{aux2}$ and $O_{aux3}$ have a dimension [4, b] in the example of the batch including b training data.

The information from auxiliary outputs $O_{aux1}$ and $O_{aux3}$ for components $c_1$, $c_3$ is used to optimize artificial neural network 200 on the way to output O. With the layers that lead to auxiliary outputs $O_{aux1}$ and $O_{aux3}$, the knowledge regarding in which classes the components belong is refined in artificial neural network 200. For output O, artificial neural network 200 learns to what extent this information aids in classifying the compound.

In a compound "tomato soup" (in German, "Tomatensuppe") for example, both terms are probably classified as TERM, and then the compound at output O as well. In a compound "canned soup," (in German, "Dosensuppe") the component "can" is probably classified as a NONTERM and the component "soup" as a TERM. For output O, artificial neural network 200 learns once again that in this component combination TERM usually predominates and represents the class.

Artificial neural network 200 learns for the compound "purslane salad," (in German, "Portulaksalat") for example, made up of a combination of "purslane" as SPECTERM and "salad" as TERM, that the class of the compound is SPECTERM.

Activation function φ is, for example, defined for a respective input $y_i$ and a respective one of the i weight matrices as $$\varphi(y_i)=\tanh(y_i*W_i)))$$

In the example, output O in this sequence characterizes the i-th of the four classes NONTERM, SIMTERM, TERM, SPECTERM. For example, the output as $O=(o_2, o_2, o_3, o_4)$ in the output layer for a respective input $y_i$ and an i-th of the n scalar outputs $o_i$ will use the following function $$o_i=\sigma(y_i)=\frac{e^{y_i}}{\sum_{k=0}^{n} e^{y_k}}$$

The value of $o_i$ indicates in the example, starting from 0 increasing to the maximum value 1, a degree of association to the class, for which $o_i$ has been determined.

The j optional additional outputs $O_{auxj}=(O_{auxj1}, O_{auxj2}, O_{auxj3}, O_{auxj4})$ each indicate i value $O_{auxji}$, which indicate in the example, also starting from 0 increasing to the maximum value 1, a degree for the association to the i-th class. More precisely, output $O_{aux}i$ indicates the degree of association of first component $c_1$ to the classes. Output $O_{aux2}$ indicates the degree of association of compound $c_2$ to the classes. Output $O_{aux3}$ indicates the degree of association of the component $c_3$ to the classes. For a further optimization of artificial neural network 200, values $O_{auxj1}$, $O_{auxj2}$, $O_{auxj3}$, $O_{auxj4}$ are used weighted in an error function. In one exemplary error function, the output of fourth output layer 214 is used weighted with a factor 1 and all optional outputs are used weighted with a factor 0.2. Another weighting may also be used. For the training of the neural network, for example, a backpropagation algorithm is utilized, which uses various outputs having various weightings for optimizing the weights of the weight matrices.

The dimensions of weight matrices W are established to be matched with the dimensions of respective input layer 202a, 202b, 202c, 202d, 202e and of respective output layer 212a, 212b, 212c, 214. Weight matrix $W_1$ of fifth concealed layer 206b, for example, has a dimension 200×64 for a 200 dimensional word vector $z_1$. Accordingly, weight matrices $W_2$ and $W_3$ of sixth concealed layer 206c and of seventh concealed layer 206d have the same dimensions also for 200 dimensional word vectors $z_2$ and $Z_3$.

The productivity and the frequency of a component are scalars in the example, associated vector $v_1$ or $v_2$ is two-dimensional. Weight matrices $W_3$ and $W_4$, for example, have the dimension 2× b in the batch of the size b. Ninth concealed layer 208a combines outputs $I_1$ and $I_4$. Tenth concealed layer 208b combines outputs $I_3$ and $I_5$. The dimensions of the respective weight matrices are adapted to the dimensions of the respective outputs and to the size of batch b.

More or fewer optional outputs and other matching dimensions may also be used. The combining of the outputs and vectors takes place, for example, via concatenation.

Artificial neural network 200 in general assigns to a feature z, v, which represents compound $c_2$ from input layer 202, in a prediction in output layer 214 of artificial neural network 200, an identifier O. The prediction takes place with the aid of the described model. The result of the prediction in the example is vector O.

Identifier O is compared in a comparison with the identifier s assigned to this feature in the training data. For example, an error function, in particular a difference between vector s and vector O, is used.

At least one parameter of the artificial neural network is learned as a function of the result of the comparison. The parameter characterizes a connection of the artificial neural network between input layer 102 and output layer 108. For example, weight matrices $W_1$ and $W_2$ are determined as a function of the difference. For this purpose, an error function is evaluated, with which the difference is minimized. The Stochastic Gradient Descent (SGD) method is used, for example.

The second specific embodiment is based on the following additional aspects as compared to the first specific embodiment.

The productivity and the frequency form a degree for a thematic assignment, i.e., a centrality, and a degree for a difficulty, i.e., a specificity or a level. Components of a compound that frequently occur in different compounds are in all probability central components for this domain. Components of a compound that occur in low numbers are in all probability components that are specific to the domain.

Compounds, which have a more or less great degree of association to a domain, are formed depending on the composition of the components. For example, a component corn may be assigned to a domain cooking or to a domain agriculture. A compound corn growing in this example may only be assigned to the domain agriculture. A compound cornmeal in this example may only be assigned to the domain cooking. A classification of the compound in this example is possible by a classification of the shared component corn and/or by the two further components-growing and-meal.

For example, one of the words or word stems of a word compound is assignable as a component to only one class. For example, each of the components is classifiable at least into one and the same class. The word compound, i.e., the compound that is made up of these components or that includes these components, is classified, for example, automatically into this class.

In another aspect of the classification, a word compound includes at least two components that are classifiable into different classes, the at least two components not being classifiable in a shared class. In this case, a classification of the compound, which is made up of these components or which includes these components, is not clear. In this case, for example, a majority decision may be automatically made, according to which the compound is classified into the class in which most of its components are also classified. Even if this is ruled out due to lacking majority, particular classes into which none of the words or none of the word stems of the word compound have been classified as a component are ruled out.

Thus, in addition to the use of the compounds themselves, a use of the components in the classification additionally provides a significant improvement of the classification. This carries weight, particularly with compounds that do not occur very frequently or whose composition in the training dataset with which the model has been trained was unknown. Even if individual components of a compound are unknown, a classification for previously unknown components may be learned in the training using this training dataset with the aid of the other components of the compound.

To create a training dataset, the word vectors are trained on a general language corpus to obtain preferably comprehensive data material. A fine adjustment takes place with the aid of a training of the word vectors on a corpus that is subject-specific to the domain. For example, text or a text collection having a known connection to this domain is used as a subject-specific corpus. In the example, the subject-specific corpus is a text collection of cooking recipes. This includes as term candidates possible technical terms from the domain "cooking." Only the subject-specific corpus is used, for example, to determine productivity or frequency.

Term candidates are identified from the subject-specific corpus. In the example, compounds are identified as term candidates. Lexical compound definitions or examples are assigned to the term candidates. A text, for example, is used as a lexical definition or example.

For the training and the classification, term candidates in the example are considered, which have a particular minimum length. Term candidates having only one letter are ignored in this case. Without a minimum length, term candidates having only one letter could alternatively be classified into the class NONTERM.

A user-based assessment with respect to a specificity and centrality is assigned to the term candidate as the gold standard for the training by an annotator or multiple annotators. In this case, a multidimensional scale is used for a term candidate in order to assign to the term candidate a classification in one of the classes NONTERM, SIMTERM, TERM or SPECTERM. Frequency and productivity, for example, are added to the training dataset as vector v in addition to word vector z. The annotators are urged to classify a term candidate into the class SPECTERM if it is very specific to the particular domain, in the example, "cooking," and exhibits a high degree of proximity to the particular domain. The annotators are urged to classify a term candidate into the class SIMTERM if it exhibits an average degree of proximity to the particular domain. The annotators are urged to classify a term candidate into the class TERM if it exhibits a high degree of proximity to the particular domain, in the example, "cooking," but is otherwise technically non-specific. The annotators are urged to classify other term candidates into the class NONTERM.

As an example of a classification of a term candidate from the subject-specific corpus, the compound "tomato puree" (in German, "Tomatenpüree") is considered. According to one definition, tomato puree is a paste produced from tomatoes, which is used in the kitchen primarily for making sauces. The compound tomato puree and the definition for classification are presented to a plurality of annotators. Some annotators classify the compound, based on this definition, for example, into the class TERM. Other annotators classify the compound, for example, into the class SPECTERM.

The training dataset in the example is supplemented by the entry tomato puree in the class, into which the compound has been classified by all or by a majority of the annotators. A training set includes, for example, an assignment of a feature that represents the entry tomato puree to one of the classes. For example, word vector z and vector v, which characterize the term candidate tomato puree are assigned as features to vector s, which characterizes the class SPECTERM.

The training dataset includes a multitude of such assignments.

In the training, a multitude of such assignments from the training dataset is used in order to learn the weight matrices.

In the second specific embodiment, the weight matrices are learned as a function of the features that represent the compounds. The additional features, which are determined as a function of the components and of the productivity and/or frequency of the components, are also used.

In addition to the compound "tomato puree," features are used in the training, which characterize its relevant components "tomato" and "puree." For example, a correspondingly concatenated word vector z and a concatenated vector v are used, which characterize the productivity and frequency. The layers of artificial neural network 200 and the vectors and matrices for calculation are, for example, correspondingly combined and resorted for this purpose.

In generating the training dataset for the domain "cooking," the relevant compounds in the example are manually classified by annotators into the classes SIMTERM, TERM or SPECTERM, since these involve designations having different central and different specific reference to the topic cooking. The class of components is estimated based on the compounds from the training dataset in which they occur. For example, for a component "tomato," it is probably estimated that it has the class TERM, since the component "tomato" occurs very frequently in compounds such as "tomato soup," (in German, "Tomatensuppe") "tomato salad," (in German, "Tomatensalat"), "tomato soufflé," (in German, "Tomatenauflauf"), "tomato puree," (in German, Tomatenpüree"), . . . , which are classified as TERM, and less frequently in other compounds. This classification does not always have to be the same as the compound classes annotated by the annotators. Nevertheless, this information from the auxiliary outputs $O_{aux1}$ and $O_{aux3}$ optimizes the result.

Starting with this training set, a model according to the second specific embodiment is trained as described below.

All weights from the weight matrices of artificial neural network 200 are set, for example, to the same value at the start of the training. Random values may also be used.

A training of the model using the training dataset is described using the compound "tomato puree" as an example.

In a first step, the compound is parsed into components. The word compound "tomato puree" encompasses as components the word step "tomato" and the word "puree." The remaining component "n" is a compounding element in the example, and is not considered. This means, only components are used in the example, which are longer than a minimum length of two letters. The resulting relevant components ""tomato" and "puree" and the compound "tomato puree" form the input terms of the classification by the model.

In the example, artificial neural network 200 is used, whose weights are adaptable by at least one optimization function. The weights are adapted as a function of the optimization function and of the training dataset in such a way that the compound "tomato puree" is in all probability assigned to the class TERM. It may be provided to also optimize the further outputs for the components, so that the component "tomato" is in all probability assigned to the class TERM and the component "puree" is in all probability assigned to the class SPECTERM. For this purpose, an expanded training dataset is used, in which assignments of features representing known components to corresponding classes are included. This means that the compounds, more precisely, the compound vector, is used as a decision-making aid.

Figure 3:
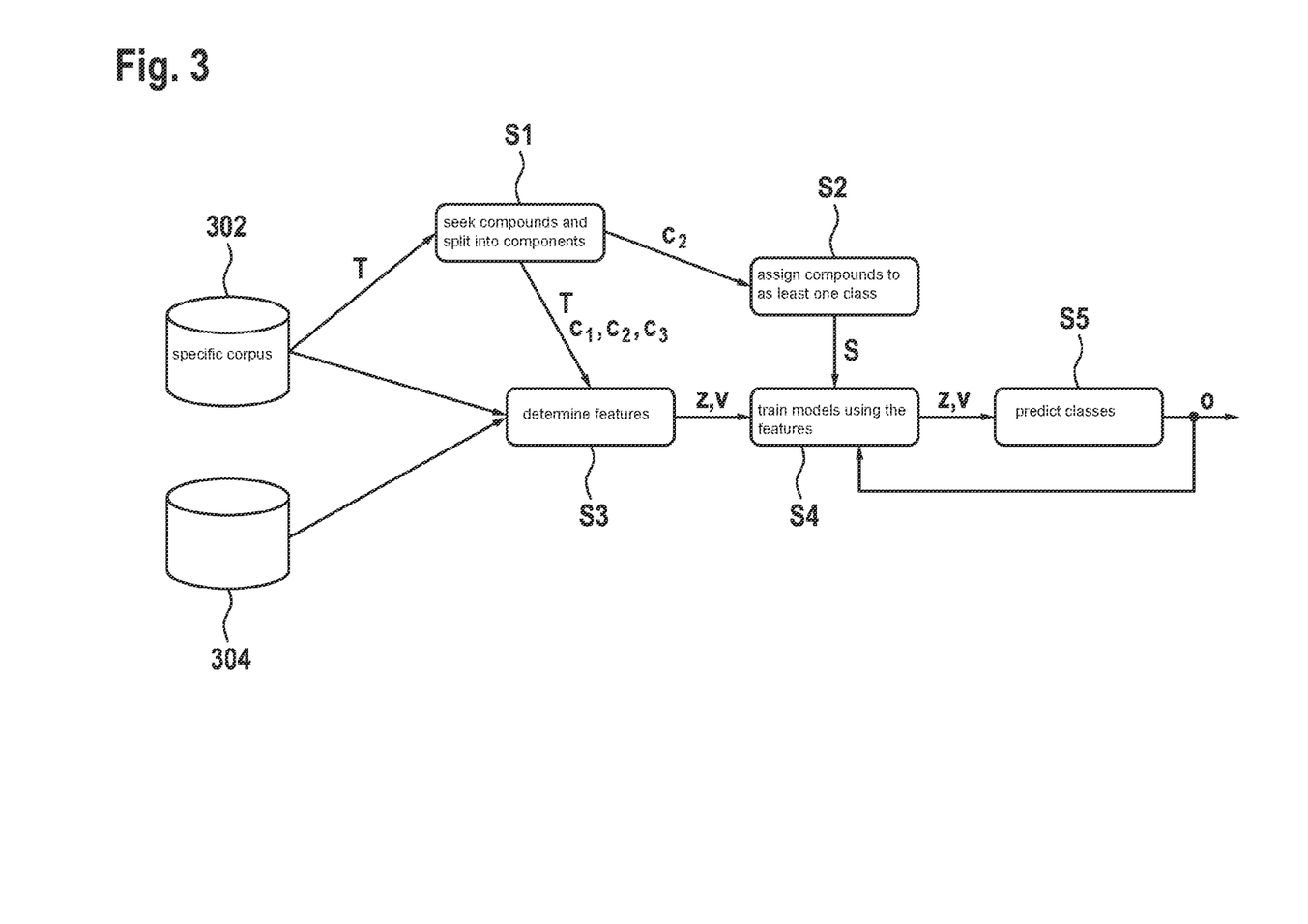
FIG. 3 schematically shows steps in a training method or classification method, in accordance with an example embodiment of the present invention.

In general, the compounds are sought as term candidates in specific corpus 302 in a first step S1, as shown in FIG. 3, and split into components. In a second step S2, the compounds are assigned to at least one of the classes automatically or by annotators. In a third step S3, the features for the compounds and the components are determined. This means, word vectors, productivity and frequency are determined on the basis of specific corpus 302. In a fourth step S4, the various models of the artificial neural network are trained using the features, in order for the compounds to predict their classes in a fifth step S5.

An analysis of a text containing the compound "tomato puree" with the aid of the model according to the second specific embodiment, which has been trained using the corresponding training dataset, includes the following aspects.

The compound tomato puree is initially separated into its components. The resulting relevant components "tomato" and "puree" are assessed in the subject-specific corpus with respect to their productivity and their frequency. The features are transferred to the corresponding input layers of the model as a function of the compound tomato puree, its relevant components tomato and puree, as well as of the productivity and the frequency. The compound "tomato puree" is assigned to one of the classes.

The compounds and their components are optionally generated by a splitter, which extracts compounds c as term candidates T from a subject-specific corpus, and splits them into a number i components $c_i$.

The splitter operates, for example, as described in one of the following references:

CharSplit: "Character ngram-based splitting of sparse compound nouns," Appendix A.3, Don Tuggener, 2016 Incremental Coreference Resolution for German, Thesis presented to the Faculty of Arts and Social Sciences of the University of Zurich.

CompoST: Fabienne Cap, 2014, "Morphological Processing of Compounds for Statistical Machine Translation," paper submitted to the Institute for Machine Language Processing, University of Stuttgart.

SCS: Marion Weller-Di Marco, 2017, "Simple compound splitting for German," Proceedings of the $13^{th}$ workshop on Multiword Expressions, MWE@EACL 2017, pages 161-166, Valencia, Spain.

Compounds from the subject-specific corpus in German are preferably initially split using an approach according to CompoST. The approach according to SCS is subsequently applied and finally the approach according to CharSplit is applied. Particularly good results are achieved thereby. Corresponding other splitters are used in the same manner for other languages.

If an analysis of the text is carried out with the aid of the model according to the first specific embodiment, the approach as described for the second specific embodiment is used. The step of separation into components and the determination and use of productivity and frequency are eliminated in this case. Instead, the model according to the first specific embodiment is used directly with the term candidates.

Both methods for text analysis represent a significant improvement for conventional methods for classifying text.

Instead of the exclusive use of an artificial neural network, it is also possible to use other machine learning approaches. For example, another deep learning approach or another classifier may be used, which is able to predict for more than two classes. Instead of a computer-implemented method based on an artificial neural network, it is possible to also use another statistical method for the classification.

In one aspect, the classification of text includes the artificial neural network. The artificial neural network may be designed as a device, for example as specific hardware, for example, an application-specific integrated circuit, ASIC, or a field-programmable logic gate array, FPGA. The system may also include a processor as a universal integrated circuit, which represents the artificial neural network or cooperates with the specific hardware. The artificial neural network represents, in particular, for a computer including a universal integrated circuit, a computer-implemented data structure, which significantly improves the internal operating mode of the computer itself.

What is claimed is:

1. A computer-implemented method for training an artificial neural network using training data, which include features and identifiers, the features characterizing term candidates from a corpus, the corpus encompassing a text from a domain, each of the identifiers characterizing a degree of association to at least three classes for the term candidates that differ from one another, the different classes indicating different degrees of association of the term candidate to the domain, the training data including an assignment of the features to the identifiers, the method comprising the following steps: predefining a feature of the features to an input layer of the artificial neural network; assigning, by the artificial neural network, an identifier of the identifiers to the feature from the input layer in a prediction in an output layer of the artificial neural network; comparing the identifier from the output layer with the identifier assigned to the feature in the training data; and learning, as a function of the result of the comparison, at least one parameter of the artificial neural network, which characterizes a connection of the artificial neural network between the input layer and the output layer; wherein the term candidates are compounds including at least two components; wherein the compounds are from a corpus subject-specific to the domain and are split as term candidates into components, the compounds are assigned to at least one of the classes, the features for the compounds and the components are determined; and wherein a productivity and a frequency of the components are determined as the features for the compounds and the components based on the corpus.

2. The method as recited in claim 1, wherein the term candidates are drawn from a corpus subject-specific to the domain.

3. The method as recited in claim 2, wherein the term candidates are assigned to at least one of the classes and the features for the term candidates are determined, a word vector being determined, and at least one parameter of the artificial neural network being trained using the features for the term candidates.

4. The method as recited in claim 1, wherein at least one parameter of the artificial neural network is trained using the features for the compounds and the components.

5. The method as recited in claim 4, wherein at least one word vector is determined as at least one of the features.

6. A computer-implemented method for generating training data for a training of an artificial neural network, the training data including features and identifiers, the method comprising the following steps: determining features which characterize term candidates from a corpus, the corpus including a text from a domain; determining a respective identifier which characterizes a degree of association to at least three classes for the term candidates that differ from one another, the different classes indicating different degrees of association of the term candidates to the domains; and assigning at least one of the identifiers to at least one of the features; wherein the term candidates are compounds including at least two components; wherein the compounds are from a corpus subject-specific to the domain and are split as term candidates into the components, the compounds are assigned to at least one of the classes, and the features for the compounds and the components are determined; and wherein a productivity and a frequency of the components are determined as the features based on the corpus.

7. The method as recited in claim 6, wherein the term candidates are drawn from a corpus subject-specific to the domain.

8. The method as recited in claim 7, wherein the term candidates are assigned to at least one of the classes and the features are determined for the term candidates, a word vector being determined.

9. The method as recited in claim 6, wherein at least one word vector is determined as at least one of the features.

10. An artificial neural network, comprising: an input layer, a feature being predefinable for the input layer; and an output layer, the artificial neural network being configured to assign an identifier to the feature from the input layer in a prediction in the output layer, the feature characterizing term candidates from a corpus, the corpus including a text from a domain, the identifier characterizing at least three classes for the term candidates that differ from one another, different classes indicating different degrees of association of the term candidates to the domain; wherein the artificial neural network includes at least one first input layer to which a compound and its components are predefinable for a first feature, the artificial neural network including at least one second input layer for which a productivity and a frequency of the components are predefinable fora second feature, the output layer being situated downstream from the first and second input layers and outputting the identifier in the prediction as a function of the first feature and of the second feature.

11. The artificial neural network as recited in claim 10, wherein the artificial neural network includes a further output layer, which is configured to output a degree of an association of the compound to the at least three classes regard less of the productivity and of the frequency of its components.

12. The artificial neural network as recited in claim 10, wherein the artificial neural network includes a further output layer which is configured to output a degree of an association of one of the components to the at least three classes as a function of the productivity and of the frequency of the component.

13. A method for classifying term candidates, the method comprising: predefining a feature to an input layer of an artificial neural network; assigning an identifier to the feature from the input layer in a prediction in an output layer of the artificial neural network, the feature characterizing term candidates from a corpus, the corpus including a text f rom a domain, the identifier characterizing at least three classes for the term candidates that differ from one another, the different classes indicating different degrees of association of the term candidates to the domain; wherein a compound and its components for a first feature is predefined to a first input layer of the artificial network, a productivity and a frequency of the components for a second feature is predefined to a second input layer, the output layer is situated downstream from the first and second input layers, and the identifier in the prediction is output as a function of the first feature and of the second feature.

* * * * *